United States Patent [19]

Satomi

[11] Patent Number: 4,472,048
[45] Date of Patent: Sep. 18, 1984

[54] SLIT EXPOSURE OPTICAL SYSTEM IN ELECTROPHOTOGRAPHIC COPYING MACHINE

[75] Inventor: Toyokazu Satomi, Yokohama, Japan

[73] Assignee: Ricoh Co. Ltd., Tokyo, Japan

[21] Appl. No.: 425,333

[22] Filed: Sep. 28, 1982

Related U.S. Application Data

[63] Continuation of Ser. No. 81,628, Oct. 4, 1979, abandoned.

[30] Foreign Application Priority Data

Oct. 19, 1978 [JP] Japan .................. 53-128897

[51] Int. Cl.³ .................. G03G 15/04; G03G 15/28
[52] U.S. Cl. .................. 355/8; 355/11; 355/57
[58] Field of Search .................. 355/3 R, 8, 11, 43, 355/51, 57, 1

[56] References Cited

U.S. PATENT DOCUMENTS

| | | | |
|---|---|---|---|
| 3,609,024 | 9/1971 | Suzuki | 355/51 |
| 3,709,602 | 1/1973 | Satomi | 355/57 X |
| 3,897,148 | 7/1975 | Ritchie et al. | 355/57 |
| 3,901,586 | 8/1975 | Suzuki et al. | 355/57 X |
| 3,973,825 | 8/1976 | Starkweather | 355/8 X |
| 4,212,532 | 7/1980 | Suzuki | 355/8 X |
| 4,232,960 | 11/1980 | Glab | 355/8 |

Primary Examiner—Fred L. Braun
Attorney, Agent, or Firm—Wyatt, Gerber Shoup, Scobey & Badie

[57] ABSTRACT

An optical system for directing a light image of a scanned original to a charged photosensitive surface of an electrophotographic copying apparatus, includes an imaging lens located between the original and the photosensitive surface. The optical axis of the imaging lens is directed normally to the original and the lens is movable in a direction substantially parallel to the original during scanning of the original. At least one mirror is disposed to receive the imaging rays from the imaging lens to reflect them onto the photosensitive surface, and each mirror is moved synchronously in a different direction from the lens to maintain the rays reflected from the original at a proper position during scanning.

26 Claims, 3 Drawing Figures

F I G. I

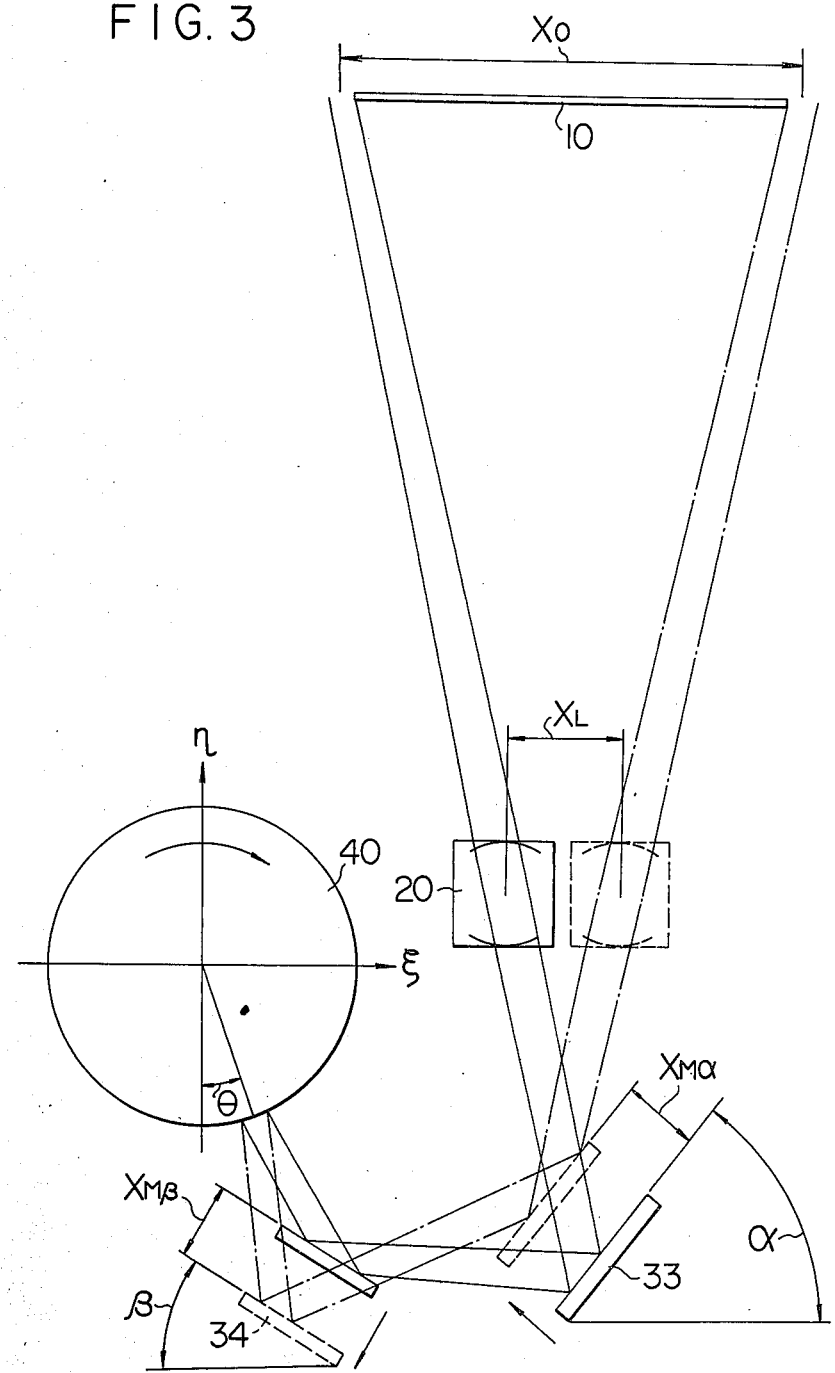

SLIT EXPOSURE OPTICAL SYSTEM IN ELECTROPHOTOGRAPHIC COPYING MACHINE

This is a continuation of application Ser. No. 081,628 filed Oct. 4, 1979, now abandoned.

BACKGROUND OF THE INVENTION

The present invention relates to a slit exposure optical system for electrophotographic copying machines.

As the representative coventional slit exposure systems, there are known two types. In one type, the original is moved while the exposure optical system is set stationary. In the other type, the original is placed in a predetermined position and the exposure optical system is moved.

In the history of improvement of copying machines, increasing the speed of copying has always been one of the guiding principles for improvement of copying machines. From the viewpoint of increasing the speed of copying, the slit exposure system having a movable exposure optical system, while setting the original stationery, is more suitable for increasing the speed of copy than the original-moving type slit exposure system, since in the original-moving type, the inertia of the moving portion itself is so great that it is difficult to reciprocate the moving portion at a high speed. Furthermore, depending upon the kind of originals to be copied, for instance, depending upon whether the original is a sheet or a book, the inertia of the moved portion varies. Therefore, it is difficult to move various originals at a constant speed.

In a typical slit exposure system of the type in which the exposure optical system is moved relative to a stationary original, an image formation lens system is fixed, while a pair of plane mirrors, which are disposed on the side of the original with respect to an exposure light path, are moved at a 2:1 speed ratio, and the original is scanned. In this system, one of the plane mirrors is reciprocated over the full length of the original to be copied in the scanning direction of the original, and its backward movement does not contribute to the copying of the original. Therefore, in order to increase the copying speed, the backward movement speed of the pair of the plane mirrors has to be increased as much as possible. As a matter of course, there is a limit to the increase of the backward movement speed.

In order to overcome this limit, the reduction of the movement path of the exposure optical system is considered. As a matter of fact, a method of performing slit exposure while moving the image formation lens system is proposed, for example, in Japanese laid-open patent application No. 50-87654, or a method of moving both the image formation lens system and the original is proposed, for example, in Japanese patent publication No. 49-31333. The inventor of the present invention proposed a system for moving a pair of plane mirrors, disposed on the side of a photoconductor, relative to an image formation lens system in Japanese laid-open patent application No. 53-102041.

In the above-mentioned methods of moving the image formation lens system or the pair of plane mirrors, the moving distance of the image formation lens system or of the pair of plane mirrors is half of the length of the original in the scanning direction thereof and therefore, the adoption of these slit exposure systems has increased the copying speed. For instance, in the system of the type of moving the image formation lens system, 75 B4-size copies can be obtained per minute. On the other hand, in the system of the type when both the image formation lens system and the original when moved at the same time, the moving distance of the plane mirrors can be reduced further in comparison with the above-mentioned two methods. However, this system is not promising with respect to high speed copying on the ground that transporting original is still unsuitable for high speed copying.

SUMMARY OF THE INVENTION

It is therefore an object of the invention to provide an improved slit exposure optical system for use in electrophotography.

Another object of the invention is to provide a slit exposure optical system for use in electrophotographic copying apparatus, capable of increasing copying speed further by reducing the moving distance of the exposure optical system without moving originals to be copied.

A further object of the invention is to provide a slit exposure optical system for use in electrophotographic copying apparatus, which has a great degree of freedom in its design and is suitable for high speed copying.

A feature of the invention is that a pair of plane mirrors are disposed on the side of a photoconductor with respect to an image formation lens system and that both the image formation lens system and the pair of mirrors are moved, while moving the surface of the photoconductor, so that slit exposure of the photoconductor is performed. In the invention, a latent electrostatic image and a visible image, which are in the mirror image relationship with the original, are formed on the photoconductor. The pair of plane mirrors are used in order to form a latent electrostatic image, which is a reflected image of the original, and a visible image on the photoconductor and to transfer the visible image to a recording sheet, whereby a copied image which is an erecting image of the original is obtained. Therefore, the number of the plane mirrors, namely one or two, is not essential to the principle of the invention.

BRIEF DESCRIPTION OF THE DRAWINGS

In the drawings:

FIG. 3 is partial schematic plan view of another embodiment of a slit exposure optical system according to the invention.

DETAILED DESCRIPTION OF THE PREFERRED EMBODIMENTS

Before explaining the preferred embodiments according to the invention, a principle of the invention will now be explained by giving an example of an exposure optical system employing one mirror for the convenience of the explanation.

Figure 1:
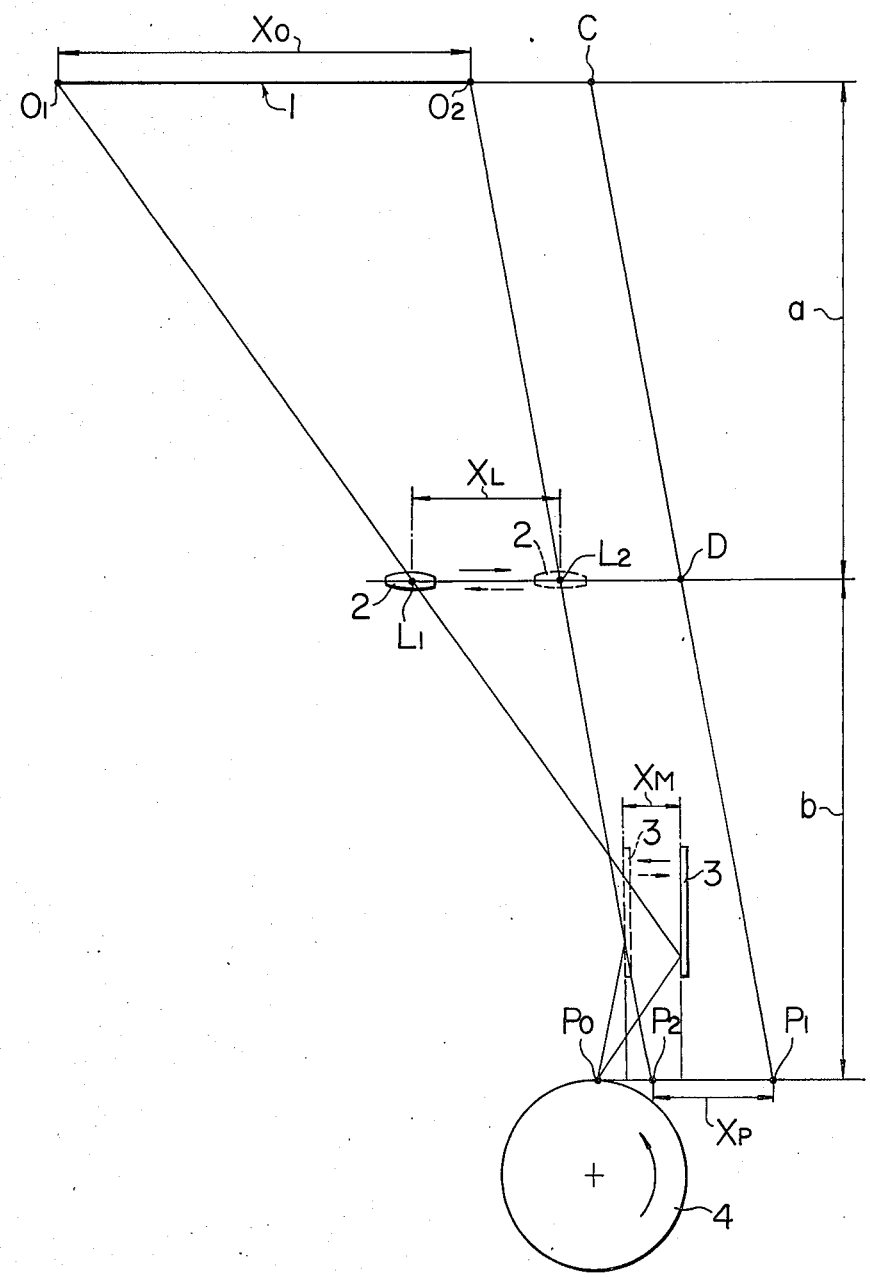
FIG. 1 is a diagram for explaining the principle of the invention.

Referring to FIG. 1, reference numeral 1 represents an original stacking surface, and $X_0$ represents the distance between points $O_1$ and $O_2$, which is an original scanning distance.

Reference numeral 2 represents an image formation lens system. The image formation lens system 2 is disposed movably in both directions as indicated by the arrows, with the optical axis thereof kept normal to the original stacking surface 1. When the image formation lens system 2 is at a position indicated by solid line, an image at point $O_1$ on the original stacking surface 1 is formed at point $P_1$, and when the image formation lens system 1 is at a position indicated by short dash line, an image at point $O_2$ on the original stacking surface 1 is formed at a point $P_2$.

Reference numberal 3 is a plane mirror. The plane mirror 3 is movable from a position indicated by solid line to a position indicated by short dash line, and vice versa as indicated by the arrows.

When the image formation lens system 2 is at the position indicated by the solid line, the plane mirror 3 is also at the position indicated by solid line, so that the image at the point $O_1$, which is to be formed at the point $P_1$, is reflected to point $P_0$ on the surface of a drum-shaped photoconductor 4. When the image formation lens system 2 is at the position indicated by short dash line, the plane mirror 3 is also at the position indicated by short dash line, so that an image at the point $O_2$, which is to be formed at point $P_2$, is reflected to point $P_0$ on the surface of the photoconductor 4.

Therefore, it can be easily seen that slit exposure of the photoconductor 4 can be attained by moving the plane mirror 3 at an appropriate speed in the direction of the solid line arrow, while moving the image formation lens system 2 in the other direction noted by the solid line arrow and rotating the drum-shaped photoconductor 4 in the direction of the arrow at a peripheral speed in conformity with the moving speed of the image at point $P_0$.

The moving distance and moving speed of the image formation lens system 2 and those of the plane mirror 3 can be obtained as follows: Suppose the moving distance of the image formation lens system 2 is $X_L$ and that of the plane mirror 3 is $X_M$, and the distance between points $P_1$ and $P_2$ is $X_P$ and, for the image formation lens system 2, the image side distance is b, and the object side distance is a.

The reason for giving different reference symbols to the object side distance and the image side distance in the image formation lens system 2 is that copying with variable magnifications is also taken into consideration. The magnification ratio m is given by b/a.

When the image formation lens system 2 is at the solid line position, its central position is indicated by $L_1$, and when the image formation lens system 2 is positioned at the short dash line position, its central position is indicated by $L_2$. When points C and D are plotted on the respective extensions of the segments of $\overline{O_1O_2}$ and $\overline{L_1L_2}$ so as to be $\overline{O_2C}=X_P$ and $\overline{L_2D}=X_P$, the following equation (1) can be obtained from the relationship of a similarity between triangle $P_1L_1D$ and $P_1O_1C$:

$$X_L = \frac{b}{a+b}(X_O + X_P) - X_P \qquad (1)$$

With respect to the plane mirror 3, the following equation can be derived from a law of reflection:

$$X_M = \tfrac{1}{2} X_P \qquad (2)$$

Combining equations (1) and (2) by cancelling $X_P$ and rewriting equation (1) for $X_0$ using the above-mentioned magnification m, gives the following equation:

$$X_0 = \frac{1+m}{m} X_L + \frac{2}{m} X_m$$

Of $X_0$, $X_L$, $X_M$ and m in equation (3), $X_0$ and m are predetermined in the specification of a given copying apparatus. Therefore, in the invention, it is required to choose $X_L$ and $X_M$ in a manner that $X_L$ and $X_M$ satisfy equation (3). Any of $X_L$ and $X_M$ can be choosen arbitraily under a predetermined condition and when one of them is determined, the other is automatically determined.

As a limit case, when $X_L=0$, $X_M=m/2X_0$ is obtained. On the other hand, when $X_M=0$, $$X_L = \frac{m}{1+m} X_O$$

is obtained. These indicate nothing but the moving distance of the conventional plane mirror or the moving distance of the conventional image formation lens system, when they are moved independently.

In the invention, since both the image formation lens system and the plane mirror are moved, both $X_L$ and $X_M$ are finite and, therefore, smaller than $$\frac{m}{1+m} X_O$$

and $(m/2)X_0$. From this, it can be understood that there is a possibility that copying speed can be increased.

The relationships between the moving speeds of the image formation lens system 2 and the plane mirror 2, $V_L$ and $V_M$, and the peripheral speed $V_D$ of the photoconductor 4, will now be obtained. For this purpose, supposing that the scanning speed on the original stacking surface is $V_0$, the time $T_0$ required for the scanning length $X_0$ on the original stacking surface to be scanned is given by $X_0/V_0$. The time $T_0$ also has to be equal to the time for the image formation lens system 2 to move over the distance $X_L$ and the time for the plane mirror 3 to move over the distance $X_M$. Namely, $T_0=X_L/V_L$ and $T_0=X_M/V_M$. Since the magnification ratio is m, the peripheral speed of the photoconductor 4 is $V_D=mV_0$. Therefore, $V_0=V_D/m$ and $T_0=mX_0/V_D$, and from $mX_0/V_D=X_L/V_L$, $V_L=V_DX_L/mX_0$ is obtained, and from $mX_0/V_D=X_M/V_M$, $V_M=V_DX_M/mX_0$ is obtained. Returning back to equation (3), if $$X_{L1} = \frac{1+m}{m} X_L$$

and $$X_{M1} = \frac{2}{m} X_M$$

are defined, $X_0=X_{L1}+X_{M1}$, and $V_L$ and $V_M$ can be respectively rewritten, using $X_{L1}$ and $X_{M1}$, as follows:

$$V_L = \frac{1}{1+m} \cdot \frac{V_D X_{L1}}{X_O}, \quad V_M = \frac{V_D X_{M1}}{2X_O}$$

Figure 2:
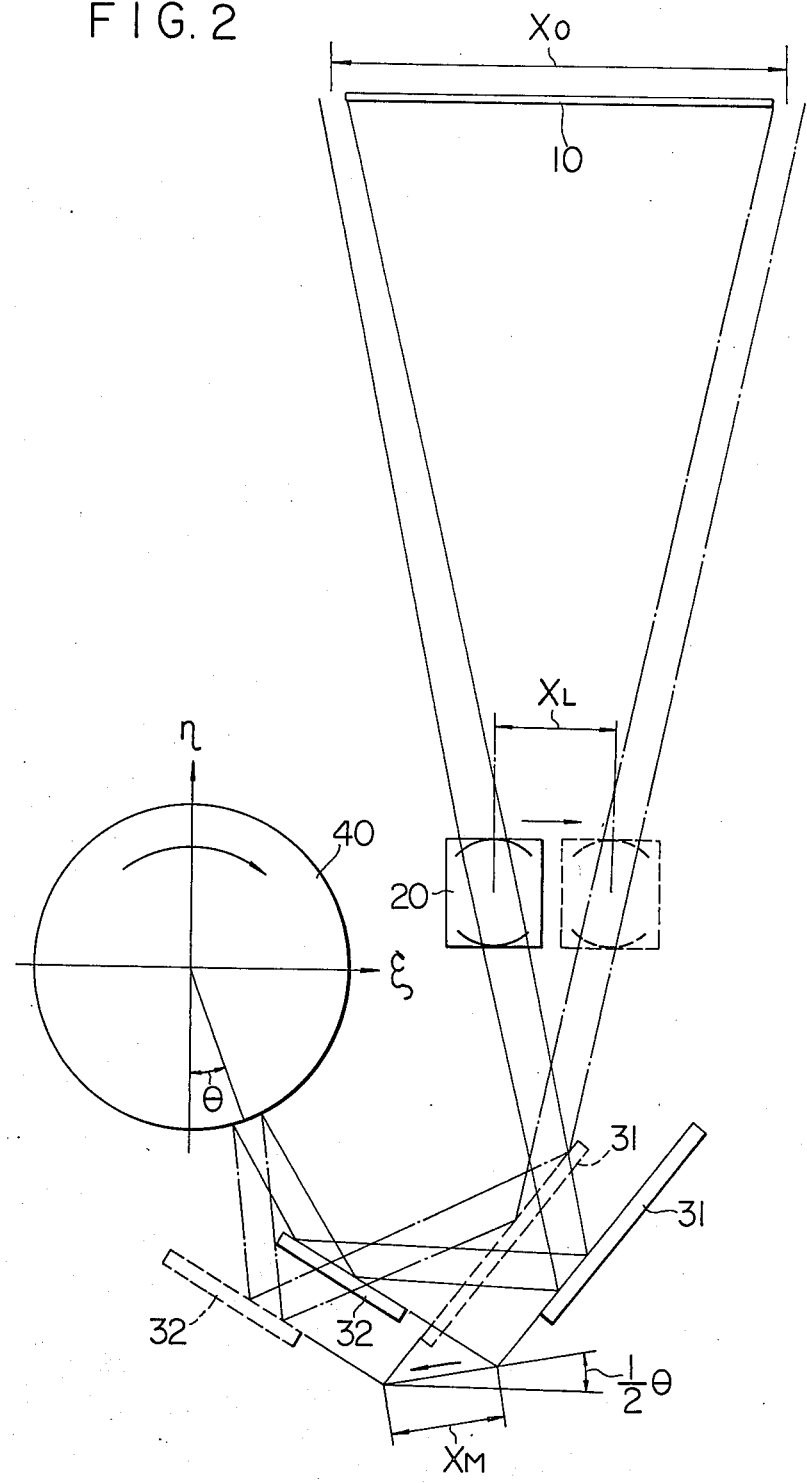
FIG. 2 is a partial schematic plane view of an embodiment of a slit exposure optical system according to the invention.

Referring to FIG. 2, there is shown an embodiment of a slit exposure optical system according to the invention. In FIG. 2, reference numeral 10 represents a contact glass, and reference numeral 20 an image formation lens system, and reference numerals 31 and 32 plane mirrors, and reference numeral 40 a photoconductor.

The upper surface of the contact glass 10 is an original stacking surface.

The image formation lens system 20 is disposed movably in the directional normal to its optical axis, with the optical axis directed normal to the original stacking surface and, at the time of scanning, the image formation lens system 20 is moved in the direction of the arrow from the position indicated by solid line to the position indicated by short dash line.

A ray of light for image formation produced by the image formation lens system 20 is successively reflected by the plane mirrors 31 and 32, so that the ray of light is led to the peripheral surface of the photoconductor 40 in the direction of an angle $\theta$ with respect to the negative direction of $\eta$, with the $\xi$ and $\eta$ directions being defined in FIG. 2.

At the time of exposure, the original stacking surface is illuminated by an illumination apparatus (not shown) with a predetermined illumination distribution.

In FIG. 2, $X_0$, $X_L$ and $X_M$ respectively have the same meanings as mentioned previously. Namely, $X_0$ represents the scanning distance on the original stacking surface, and $X_L$ and $X_M$ respectively represent the moving distance of the lens system 20 and plane mirrors 31 and 32. In this embodiment, the plane mirrors 31 and 32 are moved integrally with an angle of $\frac{1}{2}\theta$ with respect to the $\xi$ direction. At the time of exposure, the plane mirrors 31 and 32 are moved in the direction of the arrow.

The distance $X_L$ is $$\frac{m}{1+m} X_{L1}$$

which is equal to a value calculated in accordance with the principle of the invention. However, since $X_M$ is slanted by $\frac{1}{2}\theta$ with respect to the $\xi$ direction, $X_M$ is $$\frac{mX_{M1}}{2\cos\left(\frac{\theta}{2}\right)}$$

when $X_M$ is corrected by the length corresponding to the slanting of $X_M$. The moving speeds of the image formation lens system 20 and the plane mirror 31, 32 are respectively given by $$V_L = \frac{1}{1+m} \cdot \frac{V_D X_{L1}}{X_0}, \quad V_M = \frac{V_D}{2X_0} \cdot \frac{X_{M1}}{\cos\left(\frac{\theta}{2}\right)}$$

The specific values of $V_L$ and $V_M$ will now be shown with respect to a specific example. For a comparison, an exposure optical system disclosed in Japanese laid-open patent application No. 50-87654 is employed, whose copying condition is the same as that of the embodiment of the present invention. The exposure optical system of the Japanese laid-open patent application corresponds to the embodiment of the invention when $X_{M1}=0$. The following values are given to $X_0$, $V_D$, m, $\theta$, $X_{L1}$ and $X_{M1}$:

$X_0 = 320$ mm, $V_D = 500$ mm/sec, m = 1 and 0.647
$\theta_0 = 20°$, $X_{L1} = X_{M1} = 160$ mm If the values of $X_{L1}$ and $X_{M1}$ are predetermined, the movement speed of the plane mirrors 31, 32 becomes constant irrespective of the value of m, so that the moving distance $X_L$ and the moving speed $V_L$ of the image formation lens system, and the moving distance $X_M$ and the moving speed $V_M$ of the plane mirrors 31, 32 are obtained as shown in the following table:

|  | Japanese laid-open patent application No. 50-87654 | Present invention |
|---|---|---|
| m = 1 | $X_L$ = 160 mm | $X_L$ = 80 mm, $X_M$ = 81.2 mm |
|  | $V_L$ = 250 mm/sec | $V_L$ = 125 mm/sec $V_M$ = 126.9 mm/sec |
| m = 0.647 | $X_L$ = 125.7 mm | $X_L$ = 62.9 mm, $X_M$ = 52.6 mm |
|  | $V_L$ = 303.6 mm/sec | $V_L$ = 151.8 mm/sec $V_M$ = 126.9 mm/sec |

As can be seen from this table, in the invention, the moving distance and moving speed of the optical system for slit exposure are significantly improved.

Furthermore, the copying efficiency can be remarkably increased by increasing the peripheral speed of the photoconductor and the moving speed of the optical system up to its conventional limit.

Referring to FIG. 3, there is shown another embodiment of a slit exposure optical system according to the invention. In FIG. 3, the same reference numerals and symbols as those in FIG. 2 are given to the same or substantially same members as those in FIG. 2.

In this embodiment, a first plane mirror 33 and a second plane mirror 34 are moved independently during slit exposure and their backward movement. At the time of slit exposure, the two plane mirrors 33, 34 are respectively moved in the direction normal to each mirror surface thereof by the distances $X_{M\alpha}$ and $X_{M\beta}$. The starting position of each of the plane mirrors 33, 34 is indicated by solid line and when the slit exposure is finished, each of the plane mirrors 33, 34 returns to the above-mentioned starting position.

The moving distance and moving speed of the image formation lens system 20 are exactly the same as those of the image formation lens system 20 in FIG. 20.

The moving distance $X_{M\alpha}$ and moving speed $V_{M\alpha}$ of the plane mirror 33 and the moving distance $X_{M\beta}$ and moving speed $V_{M\beta}$ of the plane mirror 34 are given by $$X_{M\alpha} = \frac{m}{2\cos\left(\frac{\theta}{2}\right)} X_{M1} \cdot \sin\left(\alpha - \left(\frac{\theta}{2}\right)\right)$$

$$V_{M\alpha} = \frac{V_D}{2X_0} \cdot \frac{X_{M1}}{\cos\left(\frac{\theta}{2}\right)} \cdot \sin\left(\alpha - \left(\frac{\theta}{2}\right)\right)$$

$$X_{M\beta} = \frac{m}{2\cos\left(\frac{\theta}{2}\right)} X_{M1} \cdot \cos\left(90° - \beta - \frac{\theta}{2}\right)$$

$$V_{M\beta} = \frac{V_D}{2X_0} \cdot \frac{X_{M1}}{\cos\left(\frac{\theta}{2}\right)} \cdot \cos\left(90° - \beta - \frac{\theta}{2}\right).$$

These values are calculated under the same condition as that of the embodiment shown in FIG. 2, by setting $\alpha = 50°$ and $\beta = 30°$. When m = 1, $$X_{M\alpha} = 52.2 \text{ mm}, \quad V_{M\alpha} = 81.6 \text{ mm/sec}$$
$$X_{M\beta} = 52.2 \text{ mm}, \quad V_{M\beta} = 81.6 \text{ mm/sec}$$

When m=0.647, $$X_{M\alpha} = 33.8 \text{ mm}, \quad V_{M\alpha} = 81.6 \text{ mm/sec}$$
$$X_{M\beta} = 33.8 \text{ mm}, \quad V_{M\beta} = 81.6 \text{ mm/sec}$$

From the results, it can be seen that the moving distance of the plane mirrors is shorter in this embodiment than that in the embodiment in FIG. 2.

In the invention, the moving distance of the image formation lens system and the moving distance of the plane mirrors can be chosen as desired for the scanning distance on the original stacking surface. Therefore, these values can be set in accordance with the purpose and application of the apparatus using a slit exposure optical system. For example, in an apparatus capable of copying with magnification, the displacement of the plane mirrors for correcting an optical path is shorter than the displacement of a lens system. Therefore, the optical path can be corrected accurately by setting the moving distance of the plane mirrors greater than the moving distance of the image formation lens system.

Alternatively, the moving distance of the image formation lens system is set at a predetermined constant distance, irrespective of copy magnification ratio, so that all the changes of the scanning distance as may be caused by the copy magnification are absorbed by the moving distance of the plane mirrors. Since the moving distance of the plane mirrors can be made independent of the magnification ratio, the mechanisms of copying machine, such as a shield mechanism associated with the movement of the image formation lens system, magnification mechanism, and speed change mechanism can be simplified and therefore the control of the apparatus is simple.

What is claimed is:

1. In an electrophotographic copying machine of the type scanning an original placed flat in a predetermined position by the movement of an optical system and projecting a slit-shaped light image of a scanned portion of said original onto the surface of a photosensitive surface moved cyclically in a predetermined direction, a slit exposure optical system comprising:

an illumination apparatus for illuminating an original,
an image formation lens system including a movable lens having its optical axis disposed perpendicular to the original being scanned, means moving said imaging lens in a direction substantially parallel to said original during scanning of the original,
a pair of movable plane mirriors disposed to reflect rays of light produced by said image formation lens system onto the surface of said photosensitive surface successively, and
drive means for moving said image formation lens system and said pair of plane mirrors in synchronism with the movement of the surface of said photosensitive surface during scanning of the original.

2. A slit exposure optical system in the electrophotographic copying machine as in claim 1, wherein said pair of plane mirrors are moved integrally in the direction with a predetermined angle $\tfrac{1}{2}\theta$ with respect to the moving direction of said image formation lens system.

3. A slit exposure optical system in the electrophotographic copying machine as in claim 2, wherein the size of the produced copy equals that of the original.

4. A slit exposure optical system in the electrophotographic copying machine as in claim 3, wherein $\theta=20°$, and a scanning distance for original is $X_0=320$ mm, and the peripheral speed of said photoconductor is $V_D=500$ mm/sec, and the moving distance of said image formation lens system is $X_L=80$ mm, and the moving speed of said image formation lens system is $V_L=125$ mm/sec, and the moving distance of said pair of plane mirrors is $X_M=81.2$ mm, and the moving speed of said pair of plane mirrors is $V_M=126.9$ mm.

5. A slit exposure optical system in the electrophotographic copying machine as in claim 2, wherein the size of the produced copy is 0.647 of the original.

6. A slit exposure optical system in the electrophotographic copying machine as in claim 5, wherein $\theta=20°$, and a scanning distance for original is $X_0=320$ mm, and the peripheral speed of said photoconductor is $V_D=500$ mm/sec, and the moving distance of said image formation lens system is $X_L=80$ mm, and the moving speed of said image formation lens system is $V_L=125$ mm/sec, and the moving distance of said pair of plane mirrors is $X_M=81.2$ mm, and the moving speed of said pair of plane mirrors is $V_M=126.9$ mm.

7. A slit exposure optical system in the elecphotographic copying machine as in claim 1, wherein said pair of plane mirrors are respectively disposed with an angle $\alpha$ and angle $\beta$ with respect to the moving direction of said image formation lens system, and are moved independently of each other in the direction normal to the mirror surface of each of said mirrors.

8. A slit exposure optical system in the electrophotographic copying machine as in claim 7, wherein the size of the produced copy equals that of the original.

9. A slit exposure optical system in the electrophotographic copying machine as in claim 8, wherein $\alpha=50°$ and $\beta=30°$, and a scanning distance for original is $X_0=320$ mm, and the peripheral speed of said photoconductor is $V_D=500$ mm/sec, and the moving distance of said image formation lens system is $X_L=80$ mm, and the moving speed of said image formation lens system is $V_L=125$ mm/sec, and the moving distance of a first plane mirror is $X_{M\alpha}=52.2$ mm, and the moving speed of said first plane mirror is $V_{M\alpha}=81.6$ mm/sec, and the moving distance of a second plane mirror is $X_{M\beta}=52.2$ mm, and the moving speed of said second plane mirror is $V_{M\beta}=81.6$ mm/sec.

10. A slit exposure optical system in electrophotographic copying machine as in claim 7, wherein the size of the produced copy is 0.647 of the original.

11. A slit exposure optical system in the electrophotographic copying machine as in claim 10, wherein $\alpha=50°$ and $\beta=30°$, and a scanning distance for original is $X_0=320$ mm, and the peripheral speed of said photoconductor is $V_D=500$ mm/sec, and the moving distance of said image formation lens system is $X_L=125$ mm/sec, and the moving distance of a first plane mirror is $V_{M\alpha}=33.8$ mm, and the moving speed of said first plane mirror is $V_{M\alpha}=81.6$ mm/sec and the moving distance of a second plane mirror is $X_{M\beta}=33.8$, and the moving speed of said second plane mirror is $V_{M\alpha}=81.6$ mm/sec.

12. A slit exposure optical system in the electrophotographic copying machine as in claim 1, including means for changing the ratio of the size of the produced copy relative said original, and said pair of plane mirrors are moved to predetermined positions in accordance with the changing of said ratio.

13. A slit exposure optical system in the electrophotographic copying machine as in claim 12, wherein the moving distance of said pair of plane mirrors for scanning is greater than the moving distance of said image formation lens system for scanning, irrespective of said ratio.

14. A slit exposure optical system in the electrophotographic copying machine as claimed in claim 13, wherein the moving distance for scanning of said image formation lens system is constant irrespective of said ratio, and the moving distance of said pair of plane mirrors absorbs the change of the scanning distance due to said ratio.

15. A slit exposure optical system in the electrophotographic copying machine as in claim 12, wherein the moving distance for scanning of said image formation lens system is constant irrespective of said ratio and the moving distance of said pair of plane mirrors absorbs the change of the scanning distance due to said ratio.

16. An optical system for directing a light image of a scanned original to a charged photosensitive surface movable cyclically past an exposure station of an electrophotographic copying apparatus, said optical system including an imaging lens located between said original and said surface and having its optical axis disposed generally perpendicular to said original, means for moving said imaging lens in a direction substantially parallel to said original during scanning of the original, at least one mirror disposed to receive the imaging rays from said imaging lens and reflecting them onto said photosensitive surface, and means for moving each said mirror synchronously in different directions with said lens during scanning of the original to maintain said reflected rays at said exposure station.

17. An optical system as defined in claim 16, said mirror means moving each said mirror at a speed less than half the moving speed of said photosensitive surface.

18. An optical system as defined in claims 16 or 17, each said mirror being arranged to reflect said rays to said photosensitive surface at an acute angle relative to a line normal to the original.

19. An optical system as defined in claim 18, including two of said mirrors being disposed at an obtuse angle relative one another.

20. An optical system as defined in either claim 1 or claim 16, said lens being moved in a first direction and each said mirror being moved in a direction whereby the component thereof parallel to the movement of said lens is in the direction opposite the direction of movement of said lens.

21. An optical system as defined in either claim 1 or claim 16, the distance of movement of said lens and each said mirror being less than half the length of the original.

22. In an electrophotographic copying machine of the type scanning an original, a slit exposure system comprising:
   a contact glass for receiving an original to be copied thereon;
   an image formation lens disposed under said contact glass and having an optical axis disposed generally perpendicular to said contact glass;
   a drum-shaped photoconductor adapted to be rotated in a predetermined direction during scanning of the original;
   an exposure station located adjacent a lower peripheral surface of said photoconductor, said exposure station being located at a position offset by an angle $\theta$ towards said image formation lens with respect to a line passing through the rotational center of said photoconductor and extending parallel to the optical axis of said image formation lens;
   a lens drive means for moving said image formation lens during the scanning of the original in the direction substantially opposite to the moving direction of the peripheral surface of said photoconductor adjacent said exposure station, and in the direction substantially parallel to said contact glass;
   a pair of movable plane mirrors disposed to reflect rays of light from said image formation lens onto said exposure stations successively; and
   a mirror drive means for moving said pair of plane mirrors during the scanning of the original in a direction generally opposite to the moving direction of said image formation lens, with the optical path between said image formation lens and said exposure station kept of constant length.

23. A slit exposure system as in claim 22, wherein said pair of movable plane mirrors are moved integrally.

24. A slit exposure system as in claim 23, wherein said pair of movable plane mirrors are moved along a path which is inclined with an angle $\frac{1}{2}\theta$ with respect to a line parallel to said contact glass, in such a manner that the distance between said path and said contact glass is increased as said pair of movable plane mirrors are moved during the scanning of the original.

25. A slit exposure system as in claim 22, wherein each of said pair of movable plane mirrors is moved independently.

26. A slit exposure system as in claim 22, wherein said angle $\theta$ is less than 45°.

* * * * *